(12) United States Patent
Shiau et al.

(10) Patent No.: US 8,514,343 B2
(45) Date of Patent: Aug. 20, 2013

(54) BEAM SPLITTING FILM, BACKLIGHT MODULE, AND STEREO DISPLAY APPARATUS

(75) Inventors: Tzeng-Ke Shiau, Hsin-Chu (TW);
Ching-Shiang Li, Hsin-Chu (TW);
Wei-Chung Chao, Hsin-Chu (TW);
Chao-Hung Weng, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 246 days.

(21) Appl. No.: 13/032,642

(22) Filed: Feb. 23, 2011

(65) Prior Publication Data

US 2011/0221999 A1    Sep. 15, 2011

(30) Foreign Application Priority Data

Mar. 10, 2010   (TW) ............................... 99106961 A

(51) Int. Cl.
*G02F 1/1335* (2006.01)
(52) U.S. Cl.
USPC .................. 349/57; 349/15; 349/65; 349/95
(58) Field of Classification Search
USPC ............. 349/62, 65, 57, 95, 64, 15; 359/629; 362/97.1, 97.2, 339
See application file for complete search history.

(56) References Cited

U.S. PATENT DOCUMENTS

| | | | |
|---|---|---|---|
| 5,897,184 A * | 4/1999 | Eichenlaub et al. | 349/64 |
| 7,210,836 B2 * | 5/2007 | Sasagawa et al. | 362/606 |
| 7,303,323 B2 | 12/2007 | Choi et al. | |
| 7,529,048 B2 | 5/2009 | Lin | |
| 2006/0209428 A1 | 9/2006 | Dobbs et al. | |
| 2007/0165145 A1 * | 7/2007 | Sugiyama | 349/15 |

FOREIGN PATENT DOCUMENTS

| | | |
|---|---|---|
| EP | 2159483 | 3/2010 |
| TW | 475334 | 2/2002 |
| TW | M294667 | 7/2006 |

OTHER PUBLICATIONS

"Office Action of Taiwan Counterpart Application", issued on Apr. 22, 2013, p1-p7, in which the listed reference was cited.

* cited by examiner

*Primary Examiner* — Thoi Duong
(74) *Attorney, Agent, or Firm* — Jianq Chyun IP Office

(57) ABSTRACT

A beam splitting film includes a light transmissive plate, a plurality of cylindrical lenticular lenses, and a plurality of strip-shaped protrusion groups. The light transmissive plate has a first surface and a second surface. The cylindrical lenticular lenses are disposed on the first surface. The strip-shaped protrusion groups are disposed on the second surface. Each of the strip-shaped protrusion groups includes at least two strip-shaped protrusions. Each of the strip-shaped protrusion groups corresponds to one of the cylindrical lenticular lenses. A distance between an orthographic projection of a geometric center of each of the strip-shaped protrusion groups on the first surface and an orthographic projection of a geometric center of the corresponding cylindrical lenticular lens on the first surface is less than ten times of a distance between the geometric centers of two adjacent cylindrical lenticular lenses. A backlight module and a stereo display apparatus are also provided.

28 Claims, 7 Drawing Sheets

US 8,514,343 B2

BEAM SPLITTING FILM, BACKLIGHT MODULE, AND STEREO DISPLAY APPARATUS

CROSS-REFERENCE TO RELATED APPLICATION

This application claims the priority benefit of Taiwan application serial no. 99106961, filed on Mar. 10, 2010. The entirety of the above-mentioned patent application is hereby incorporated by reference herein and made a part of specification.

BACKGROUND OF THE INVENTION

1. Field of the Invention

The invention relates to an optical film, a light source module, and a display. More particularly, the invention relates to a beam splitting film, a backlight module, and a stereo display apparatus.

2. Description of Related Art

With development of display technology, displays having better image quality, richer color performance, and better performance effect are continuously developed. In recent years, a stereo display technology has extended to home display applications from cinema applications. Since a key technique of the stereo display technology is to ensure a left eye and a right eye of a user to respectively view left-eye images and right-eye images of different viewing angles, according to the conventional stereo display technology, the user generally wears a special pair of glasses to filter the left-eye images and the right-eye images.

However, to wear the special pair of glasses may generally cause a lot of inconveniences, especially for a nearsighted or farsighted user who has to wear a pair of glasses with corrected vision, and the extra pair of special glasses may cause discomfort and inconvenience. Therefore, a naked-eye stereo display technology becomes one of the key focuses in researches and developments. However, according to the current naked-eye stereo display technology, only one vision zone may be generated, and such vision zone is generally located at a center of a display. When the user lefts the vision zone, the user may not view the stereo image. Therefore, according to such stereo display technology, multiple users may not simultaneously view the stereo images.

Taiwan Patent No. 475334 discloses a dichroic layer, wherein an upper surface of the dichroic layer has a two-dimensional micro lens array, and a lower surface of the dichroic layer has a grating structure. Moreover, U.S. Pat. No. 7,303,323 discloses a prism, wherein a lower surface of the prism has a prism structure, and a hypotenuse of the prism is a circular arc. Moreover, Taiwan Patent No. M294667 and U.S. Pat. No. 7,529,048 disclose an optical film having a base film and prisms, wherein hypotenuse slopes of an upper prism and a lower prism are different, and the hypotenuse slope of the lower prism is less than the hypotenuse slope of the upper prism. U.S. Patent publication No. 20060209428 discloses an optical film structure having micro lenses and prisms, wherein the micro lenses are one-by-one corresponding to the prisms.

SUMMARY OF THE INVENTION

The invention is directed to a beam splitting film, capable of splitting an incident light beam into a plurality of light beams with different propagating angles, so as to form a plurality of vision zones.

The invention is directed to a backlight module, wherein the backlight module may form light beams capable of being viewed by a left eye and a right eye, and may simultaneously form a plurality of vision zones.

The invention is directed to a stereo display apparatus, wherein the stereo display apparatus may form a plurality of vision zones.

Additional aspects and advantages of the invention may be set forth in the description of the techniques disclosed in the invention.

To achieve at least one of aforementioned and other advantages, an embodiment of the invention provides a beam splitting film including a light transmissive plate, a plurality of cylindrical lenticular lenses, and a plurality of strip-shaped protrusion groups. The light transmissive plate has a first surface and a second surface opposite to the first surface. The cylindrical lenticular lenses are disposed on the first surface. The strip-shaped protrusion groups are disposed on the second surface. Each of the strip-shaped protrusion groups includes at least two strip-shaped protrusions. Each of the strip-shaped protrusion groups corresponds to one of the cylindrical lenticular lenses. A distance between an orthographic projection of a geometric center of each of the strip-shaped protrusion groups on the first surface and an orthographic projection of a geometric center of the corresponding cylindrical lenticular lens on the first surface is less than ten times of a distance between geometric centers of two adjacent cylindrical lenticular lenses.

Another embodiment of the invention provides a backlight module including the aforementioned beam splitting film, a light guiding plate, and two light emitting devices. The light guiding plate is disposed at a side of the beam splitting film. The light guiding plate has a third surface, a fourth surface opposite to the third surface, and two light incident surfaces connected to the third surface and the fourth surface. The two light incident surfaces are respectively located at two opposite sides of the light guiding plate, and the third surface is located between the second surface and the fourth surface. The two light emitting devices are respectively disposed beside the two light incident surfaces, and are capable of emitting two light beams. The two light beams respectively enter the light guiding plate through the two light incident surfaces, and are transmitted to the beam splitting film through the third surface, wherein the two light emitting devices are capable of alternately flickering.

Another embodiment of the invention provides a stereo display apparatus including a backlight source, a liquid crystal display (LCD) panel, and a beam splitting film. The backlight source is capable of providing an illumination beam. The LCD panel is disposed above the backlight source. The beam splitting film is disposed between the backlight source and the LCD panel, wherein the beam splitting film splits the illumination beam into a plurality of light beams with different propagating angles, so as to form a plurality of vision zones.

The embodiments of the invention may have at least one of the following advantages or effects. In the beam splitting film and the backlight module according to the embodiments of the invention, since each of the cylindrical lenticular lenses corresponds to one of the strip-shaped protrusion groups, and each of the strip-shaped protrusion groups includes at least two strip-shaped protrusions, the incident light beam may be split into a plurality of light beams with different propagating angles by the strip-shaped protrusions, so as to form a plurality of vision zones. Moreover, since the stereo display apparatus according to the embodiments of the invention applies the beam splitting film to split the illumination beam into a plurality of the light beams with different propagating angles, a plurality of vision zones may be formed. In this way, multiple users may simultaneously view stereo images from different viewing angles.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
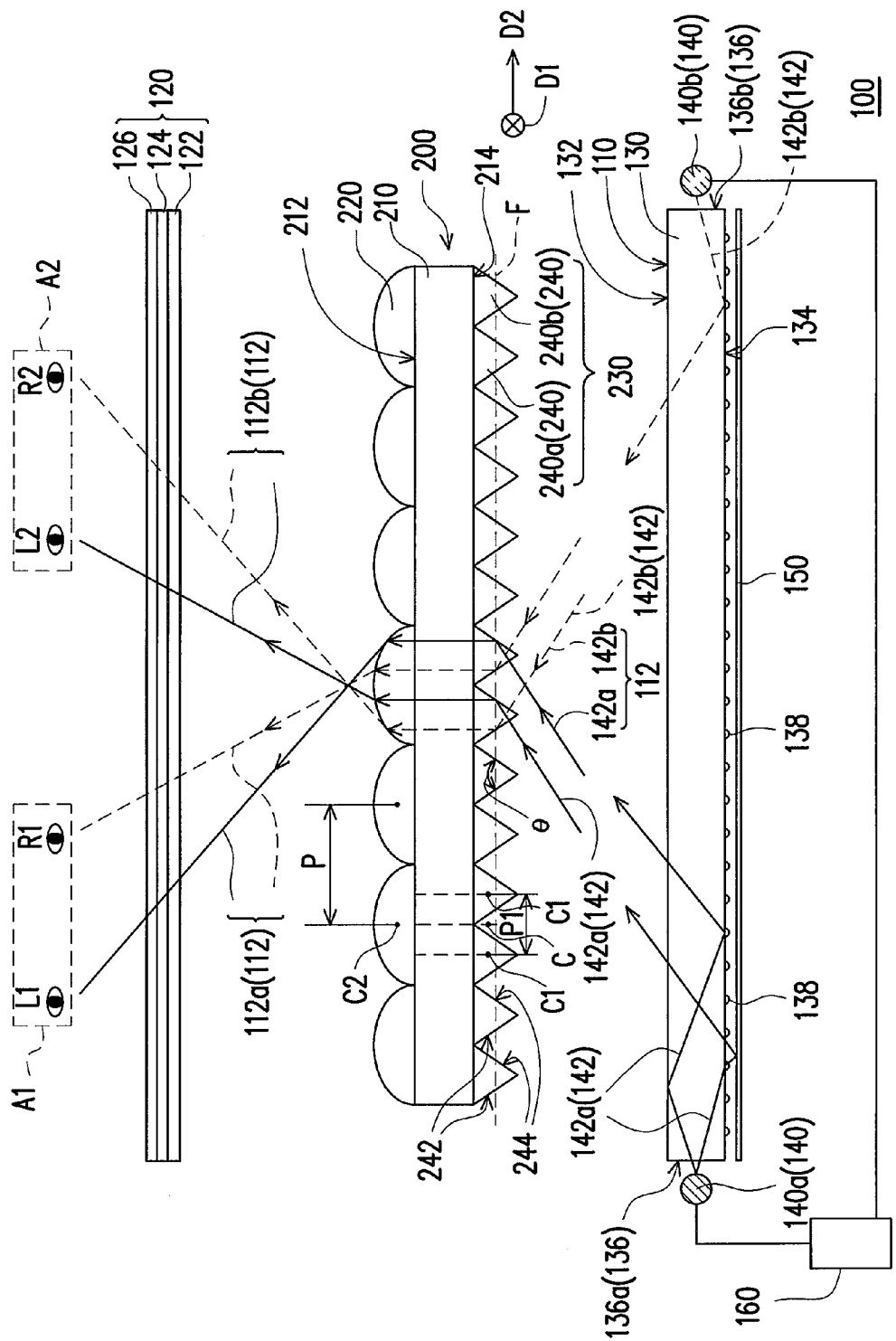
FIG. 1A is a cross-sectional view of a stereo display apparatus according to an embodiment of the invention.
Figure 1B:
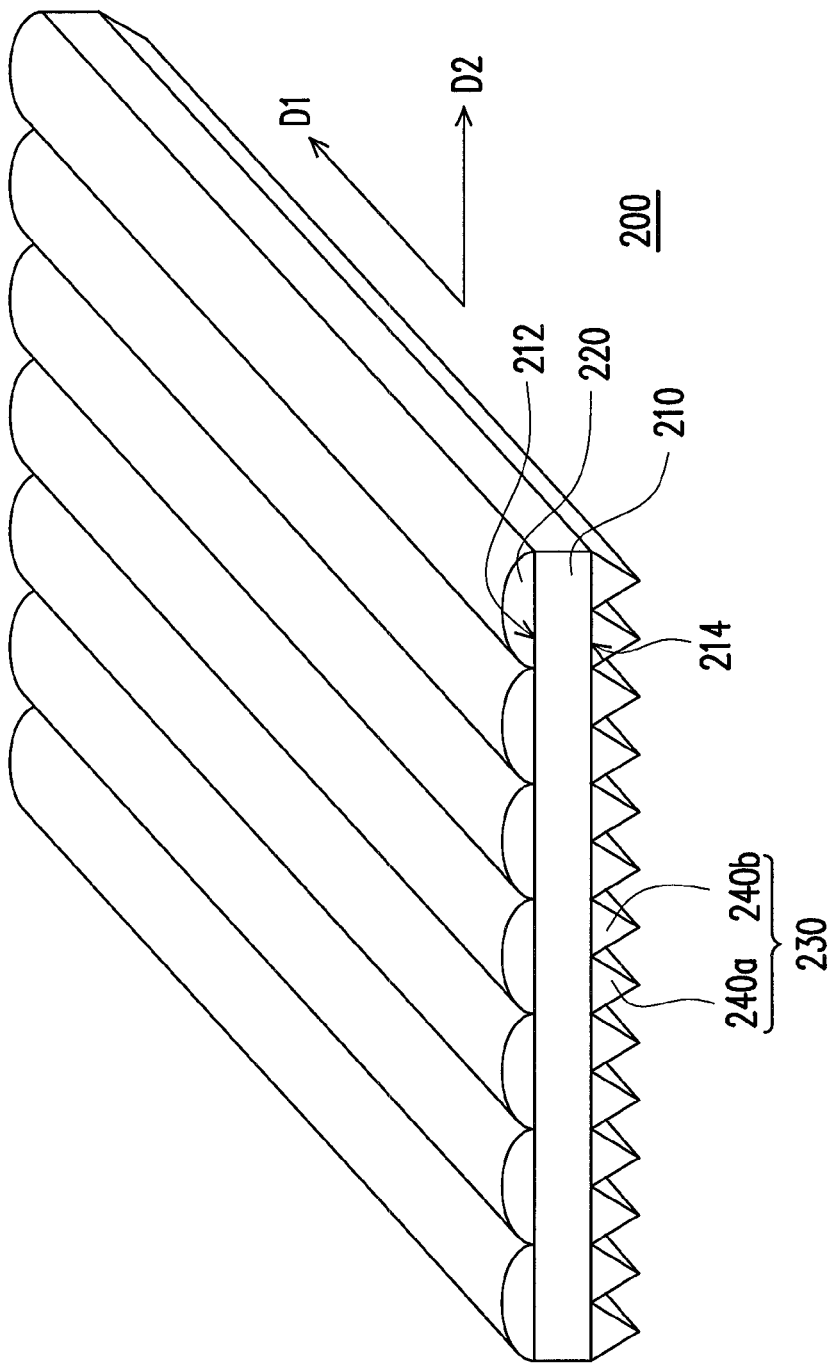
FIG. 1B is a three-dimensional view of a beam splitting film of FIG. 1A.

Referring to FIG. 1A and FIG. 1B, the stereo display apparatus 100 of the embodiment includes a backlight source 110, a liquid crystal display (LCD) panel 120, and a beam splitting film 200. The backlight source 110 is capable of providing an illumination beam 112. The LCD panel 120 is disposed above the backlight source 110. In the embodiment, the LCD panel 120 includes an active device array substrate 122, a liquid crystal layer 124, and an opposite substrate 126. The active device array substrate 122 is, for example, a thin film transistor (TFT) array substrate, and the opposite substrate 126 is, for example, a color filter array substrate.

The beam splitting film 200 is disposed between the backlight source 110 and the LCD panel 120, wherein the beam splitting film 200 splits the illumination beam 112 into a plurality of light beams (for example, light beams 112a and 112b) with different propagating angles, so as to form a plurality of vision zones. In FIG. 1A, a situation of forming two vision zones A1 and A2 is taken as an example. A right eye R1 and a left eye L1 of a user located in the vision zone A1 may view an image carried by the light beam 112a after the light beam 112a passes through the LCD panel 120. A right eye R2 and a left eye L2 of another user located in the vision zone A2 may view an image carried by the light beam 112b after the light beam 112b passes through the LCD panel 120. In this way, multiple users may simultaneously view stereo images displayed by the stereo display apparatus 100 at different viewing angles. Moreover, since a plurality of the vision zones may be formed for many users to simultaneously view images, the stereo display apparatus 100 may be fabricated in a larger size to sufficiently exploit the inherent advantage that the large-sized display device is capable of being viewed by multiple users.

In the embodiment, the beam splitting film 200 includes a light transmissive plate 210, a plurality of cylindrical lenticular lenses 220, and a plurality of strip-shaped protrusion groups 230. The light transmissive plate 210 has a first surface 212 and a second surface 214 opposite to the first surface 212. The cylindrical lenticular lenses 220 are disposed on the first surface 212. The strip-shaped protrusion groups 230 are disposed on the second surface 214. In the embodiment, each of the cylindrical lenticular lenses 220 extends along a first direction D1, and the cylindrical lenticular lenses 220 are arranged along a second direction D2. Moreover, in the embodiment, each of the strip-shaped protrusion groups 230 includes at least two strip-shaped protrusions 240, and in FIG. 1A and FIG. 1B, each of the strip-shaped protrusion groups 230, for example, includes two strip-shaped protrusions 240a and 240b. In the embodiment, each of the strip-shaped protrusions 240 extends along the first direction D1, and the strip-shaped protrusions 240 of the strip-shaped protrusion groups 230 are arranged along the second direction D2. In the embodiment, the first direction D1 is substantially perpendicular to the second direction D2.

Moreover, in the embodiment, each of the strip-shaped protrusion groups 230 corresponds to one of the cylindrical lenticular lenses 220, and a distance between an orthographic projection of a geometric center C of each of the strip-shaped protrusion groups 230 on the first surface 212 and an orthographic projection of a geometric center C2 of the corresponding cylindrical lenticular lens 220 on the first surface 212 is less than ten times of a distance P between geometric centers of two adjacent cylindrical lenticular lenses 220. In FIG. 1A, a situation that the geometric center C of each of the strip-shaped protrusion groups 230 opportunely corresponds to the geometric center C2 of the corresponding cylindrical lenticular lens 220 is taken as an example, i.e. the distance between the orthographic projection of the geometric center C of each of the strip-shaped protrusion groups 230 on the first surface 212 and the orthographic projection of the geometric center C2 of the corresponding cylindrical lenticular lens 220 on the first surface 212 is zero, though the invention is not limited thereto.

In the embodiment, the stereo display apparatus 100 further includes a light guiding plate 130 and two light emitting devices 140 (light emitting devices 140a and 140b are taken as an example in FIG. 1A). The light guiding plate 130 is disposed at a side of the beam splitting film 200, and the light guiding plate 130 has a third surface 132, a fourth surface 134 opposite to the third surface 132, and two light incident surfaces 136 (in FIG. 1A, a light incident surface 136a and a light incident surface 136b are taken as an example) connected to the third surface 132 and the fourth surface 134. The two light incident surfaces 136a and 136b are respectively located at two opposite sides of the light guiding plate 130, and the third surface 132 is located between the second surface 214 and the fourth surface 134.

The two light emitting devices 140a and 140b are respectively disposed beside the two light incident surfaces 136a and 136b, and are capable of respectively emitting two light beams 142 (in FIG. 1A, light beams 142a and 142b are taken as an example). In the embodiment, the light emitting device 140 is, for example, a cold cathode fluorescent lamp (CCFL). However, in other embodiments, the light emitting device 140 may also be a light emitting diode (LED). The two light beams 142a and 142b are capable of respectively entering the light guiding plate 130 through the two light incident surfaces 136a and 136b, and are transmitted to the beam splitting film 200 through the third surface 132. In detail, the light beams 142a and 142b are continuously totally reflected between the third surface 132 and the fourth surface 134 after the light beams 142a and 142b entering the light guiding plate 130. However, a diffusion structure 138 on the surface (for example, the third surface 132 or the fourth surface 134, and in FIG. 1A, the fourth surface 134 is taken as an example) of the light guiding plate 130 may spoil the total reflection, so that the light beams 142a and 142b may emit out from the light guiding plate 130 through the third surface 132 to reach the beam splitting film 200, or the light beams 142a and 142b are transmitted to a reflection sheet 150 below the light guiding plate 130, and are reflected by the reflection sheet 150 to further penetrate through the fourth surface 134 and the third surface 132.

In the embodiment, the two light emitting devices 140a and 140b are capable of alternately flickering, so as to alternately emit the light beams 142a and 142b. The two light beams 142a and 142b form the backlight source 110 on the third surface 132, and the two light beams 142a and 142b form the illumination beam 112. In the embodiment, a control unit 160 electrically connected to the two light emitting devices 140a and 140b may be used to drive the light emitting devices 140a and 140b to alternate flicker.

In the embodiment, each of the strip-shaped protrusions 240 has a first strip-shaped surface 242 and a second strip-shaped surface 244 connected to the first strip-shaped surface 242, the first strip-shaped surface 242 and the second strip-shaped surface 244 are all oblique to the first surface 212, and the strip-shaped protrusion 240 is, for example, a prism pillar. When the light emitting device 140a emits the light beam 142a, a part of the light beam 142a sequentially penetrates through a first strip-shaped surface 242 of the strip-shaped protrusion 240a in the strip-shape protrusion group 230 and is totally reflected by a second strip-shaped surface 244 of the strip-shaped protrusion 240a. Then, this part of the light beam 142a is refracted rightwards by a left part of the corresponding cylindrical lenticular lens 220, and is transmitted to the left eye L2 of the user located in the vision zone A2. When the light emitting device 140b emits the light beam 142b, a part of the light beam 142b sequentially penetrates through the second strip-shaped surface 244 of the strip-shaped protrusion 240a in the strip-shape protrusion group 230 and is totally reflected by the first strip-shaped surface 242 of the strip-shaped protrusion 240a. Then, this part of the light beam 142b is refracted rightwards by the left part of the corresponding cylindrical lenticular lens 220, and is transmitted to the right eye R2 of the user located in the vision zone A2. In this way, the user located in the vision zone A2 may view the stereo images.

On the other hand, when the light emitting device 140a emits the light beam 142a, another part of the light beam 142a sequentially penetrates through a first strip-shaped surface 242 of the strip-shaped protrusion 240b in the strip-shape protrusion group 230 and is totally reflected by a second strip-shaped surface 244 of the strip-shaped protrusion 240b. Then, this part of the light beam 142a is refracted leftwards by a right part of the corresponding cylindrical lenticular lens 220, and is transmitted to the left eye L1 of the user located in the vision zone A1. When the light emitting device 140b emits the light beam 142b, another part of the light beam 142b sequentially penetrates through the second strip-shaped surface 244 of the strip-shaped protrusion 240b in the strip-shape protrusion group 230 and is totally reflected by the first strip-shaped surface 242 of the strip-shaped protrusion 240b. Then, this part of the light beam 142b is refracted leftwards by the right part of the corresponding cylindrical lenticular lens 220, and is transmitted to the right eye R1 of the user located in the vision zone A1. In this way, the user located in the vision zone A1 may view the stereo images.

According to the above descriptions, by using the stereo display apparatus 100 of the embodiment, multiple users may simultaneously view the stereo images from the vision zone A1 and the vision zone A2. In this way, relatively more users may simultaneously enjoy the stereo images displayed by the stereo display apparatus 100.

In the embodiment, the first strip-shaped surface 242 and the second strip-shaped surface 244 are all, for example, planes. However, in other embodiments, the first strip-shaped surface 242 and the second strip-shaped surface 244 may also be curved surfaces, or one of the two strip-shaped surfaces is a curved surface and the other one is a plane.

To achieve a better stereo display effect, in the embodiment, a vertex angle $\theta$ of each of the strip-shaped protrusions 240 away from the second surface 214 is within a range of 40 degrees$\leq\theta\leq$90 degrees. For example, the vertex angle $\theta$ is within a range of 65 degrees$\leq\theta\leq$70 degrees. Moreover, to effectively reduce a chance that the left-eye and the right-eye images generate ghost images, in the embodiment, a focal plane F of each of the cylindrical lenticular lenses may fall within a range from the second surface 214 to a top of the strip-shaped protrusions 240 of the strip-shaped protrusion group 230 away from the second surface 214, i.e. the focal plane F and the strip-shaped protrusion 240 are intersected or tangent. In FIG. 1A, a situation that the focal plane F is located between the second surface 214 and the top of the strip-shaped protrusion 240 is taken as an example.

Moreover, to ensure that the cylindrical lenticular lenses 220 suitably correspond to the strip-shaped protrusion groups 230, in the embodiment, the distance P between the geometric centers C2 of two adjacent cylindrical lenticular lenses 220 is greater than or equal to 1.5 times of a distance P1 between geometric centers C1 of two adjacent strip-shaped protrusions 240, and in FIG. 1A, a situation that the distance P is twice of the distance P1 is taken as an example. Moreover, in the embodiment, the distance P is, for example, within a range of 3 μm≦P≦5 μm.

Figure 2:
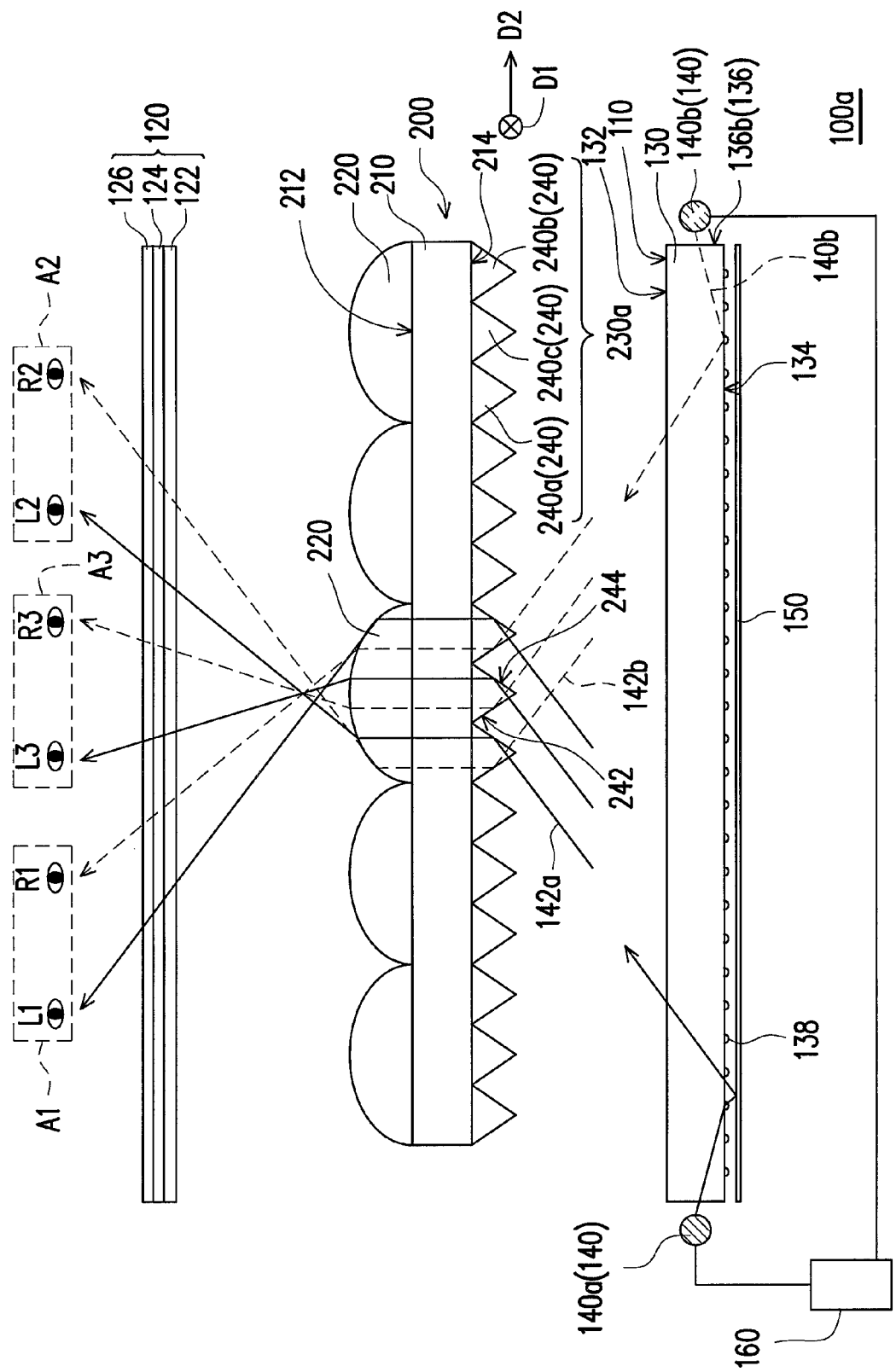
FIG. 2 is a cross-sectional view of a stereo display apparatus according to another embodiment of the invention.

Referring to FIG. 2, the stereo display apparatus 100a of the embodiment is similar to the stereo display apparatus 100 of FIG. 1A, and differences therebetween are as follows. In the embodiment, each of the strip-shaped protrusion groups 230a includes three strip-shaped protrusions 240a, 240b, and 240c, wherein functions of the strip-shaped protrusions 240a and 240b are similar to the functions of the strip-shaped protrusions 240a and 240b of FIG. 1A, so that detailed descriptions thereof are not repeated. Moreover, a part of the light beam 142a sequentially penetrates through the first strip-shaped surface 242 of the strip-shaped protrusion 240c and is totally reflected by the second strip-shaped surface 244 of the strip-shaped protrusion 240c. Then, this part of the light beam 142a is refracted leftwards by the right part of the corresponding cylindrical lenticular lens 220, and is transmitted to a left eye L3 of a user located in a vision zone A3. Moreover, a part of the light beam 142b sequentially penetrates through the second strip-shaped surface 244 of the strip-shaped protrusion 240c and is totally reflected by the first strip-shaped surface 242 of the strip-shaped protrusion 240c. Then, this part of the light beam 142b is refracted rightwards by the left part of the corresponding cylindrical lenticular lens 220, and is transmitted to a right eye R3 of the user located in the vision zone A3. In this way, besides the vision zones A1 and A2, the user located in the vision zone A3 may also view the stereo images. In other words, the stereo display apparatus 100a of the invention may generate three vision zones to facilitate more users simultaneously viewing the stereo images. Deduced by analogy, when the strip-shaped protrusion group have N strip-shaped protrusions 240, the stereo display apparatus may generate N vision zones, wherein N is greater than or equal to 2.

Figure 3:
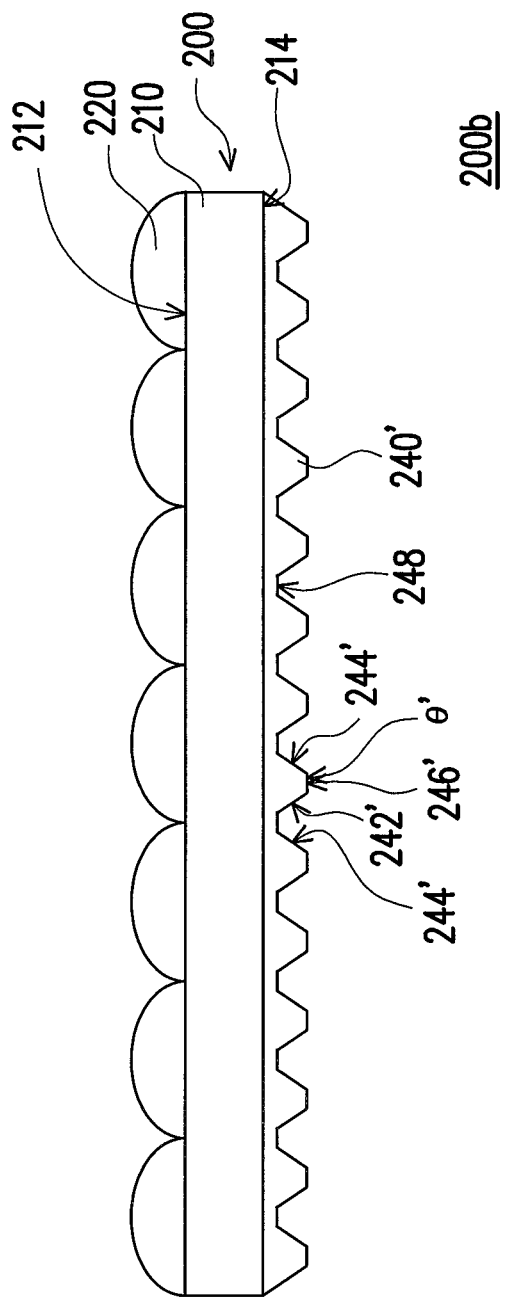
FIG. 3 is a cross-sectional view of a beam splitting film in a stereo display apparatus according to another embodiment of the invention.

Referring to FIG. 3, the beam splitting film 200b of the embodiment is similar to the beam splitting film 200 of FIG. 1A, and differences therebetween are as follows. In the embodiment, a vertex angle θ' of each of the strip-shaped protrusions 240' away from the second surface 214 is a chamfer, and the vertex angle θ' is a plane chamfer in the embodiment. In other words, the first strip-shaped surface 242' and the second strip-shaped surface 244' of each strip-shaped protrusion 240' are discontinuous, and are connected through a plane 246'. As shown in FIG. 1A, when each prism 240 reflects the light beams 142b and 142a through the first strip-shaped surface 242 and the second strip-shaped surface 244, the light beam 142a carrying the left-eye image is rather close to the light beam 142b carrying the right-eye image. The chamfer of the embodiment may effectively reduce a chance of overlapping of the light beams 142a and 142b, so as to improve a display quality and correctness of the stereo image. In another embodiment, the vertex angle θ' may also be a round chamfer (i.e. a round) or other suitable structures capable of connecting the first strip-shaped surface 242' and the second strip-shaped surface 244'. Moreover, the first strip-shaped surface 242' of one of two adjacent strip-shaped protrusions 240' and the second strip-shaped surface 244' of the other one of the two adjacent strip-shaped protrusions 240' may be connected through a plane 248, though the invention is not limited thereto.

Figure 4:
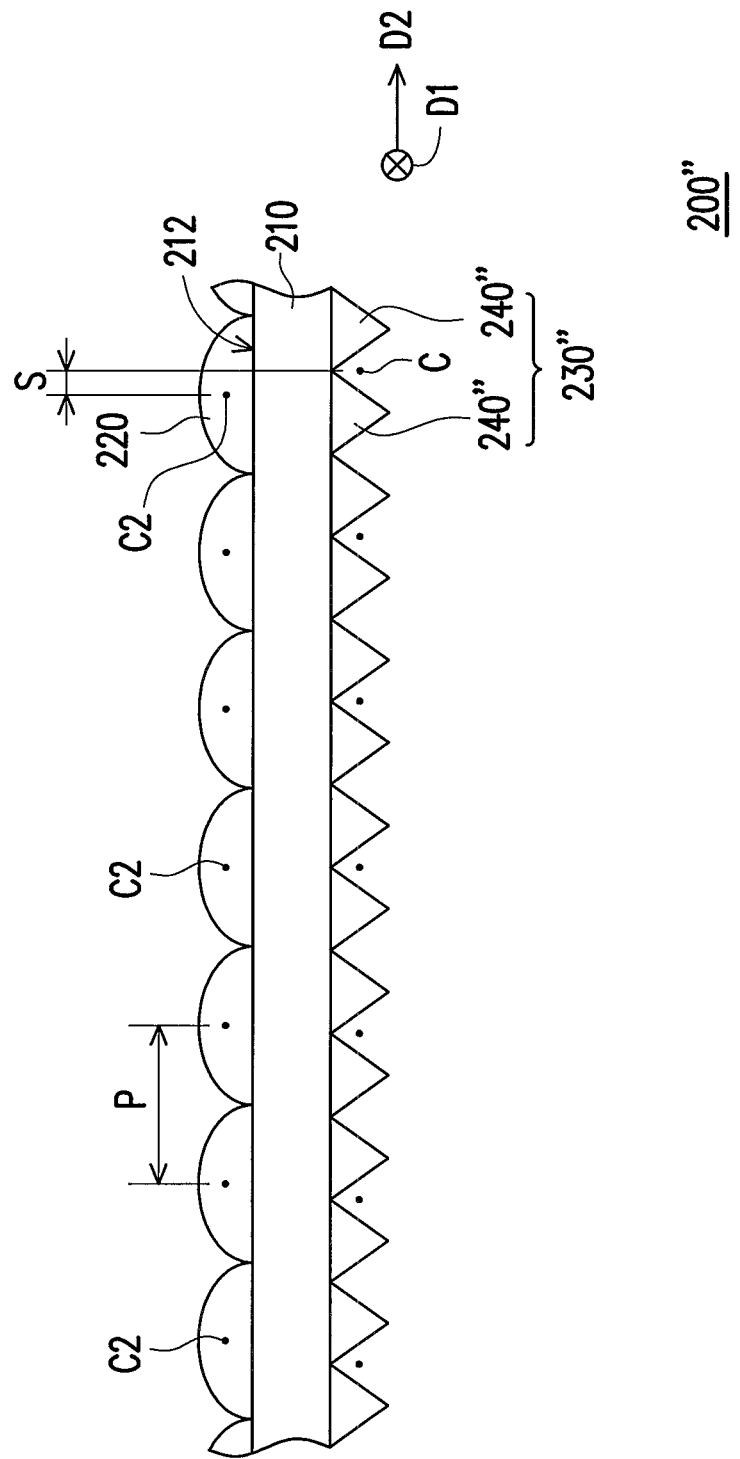
FIG. 4 is a cross-sectional view of a beam splitting film in a stereo display apparatus according to still another embodiment of the invention.

Referring to FIG. 4, the beam splitting film 200" of the embodiment is similar to the beam splitting film 200 of FIG. 1A, and differences therebetween are as follows. Since the viewing angles for the human eyes viewing a left part and a right part of the stereo display apparatus are different, when the stereo display apparatus has a large size, the corresponding relationships between the strip-shaped protrusion groups 230" and the cylindrical lenticular lenses 220 may be fine tuned to improve a display correctness of the stereo image. In more detail, offsets S of the geometric centers C of the strip-shaped protrusion groups 230" in the second direction D2 relative to the geometric centers C2 of the corresponding cylindrical lenticular lenses 220 are increased from a center of the light transmissive plate 210 towards two sides of the light transmissive plate 210 in the second direction D2, and an optimal offset S may be adjusted according to the size of the stereo display apparatus and the viewing angle of the user. Adjusting of the offset S may be achieved by increasing a pitch of the strip-shaped protrusions 240" or reducing a pitch of the cylindrical lenticular lenses 220. Moreover, to achieve better corresponding relationships between the cylindrical lenticular lenses 220 and the strip-shaped protrusion groups 230" to improve the optical quality, in the embodiment, the offset S (i.e. a distance between an orthographic projection of the geometric center C of each of the strip-shaped protrusion groups 230" on the first surface 212 and an orthographic projection of the geometric center C2 of the corresponding cylindrical lenticular lens 220 on the first surface 212) is less than ten times of a distance P between geometric centers C2 of two adjacent cylindrical lenticular lenses 220.

Figure 5:
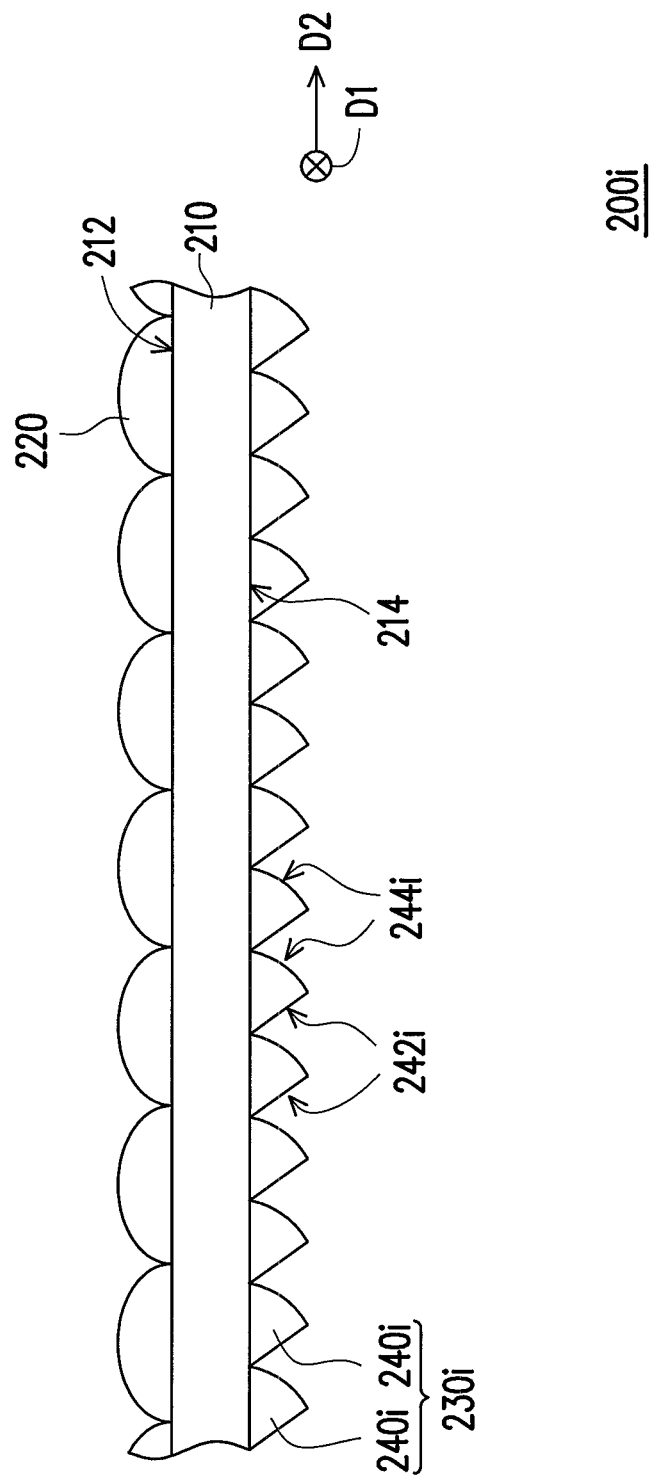
FIG. 5 is a cross-sectional view of a beam splitting film in a stereo display apparatus according to yet another embodiment of the invention.

Referring to FIG. 5, the beam splitting film 200i of the embodiment is similar to the beam splitting film 200" of FIG. 4, and differences therebetween are as follows. In the beam splitting film 200i of the embodiment, the first strip-shaped surfaces 242i of the strip-shaped protrusions 240i of the strip-shaped protrusion groups 230i are planes, the second strip-shaped surfaces 244i are curved surfaces, and the second strip-shaped surfaces 244i are, for example, curved convexes in FIG. 5. However, in other embodiments, the second strip-shaped surfaces 244i may be planes, and the first strip-shaped surfaces 242i may be curved convexes. Alternatively, the first strip-shaped surfaces 242i and the second strip-shaped surfaces 244i may be all curved convexes.

Figure 6:
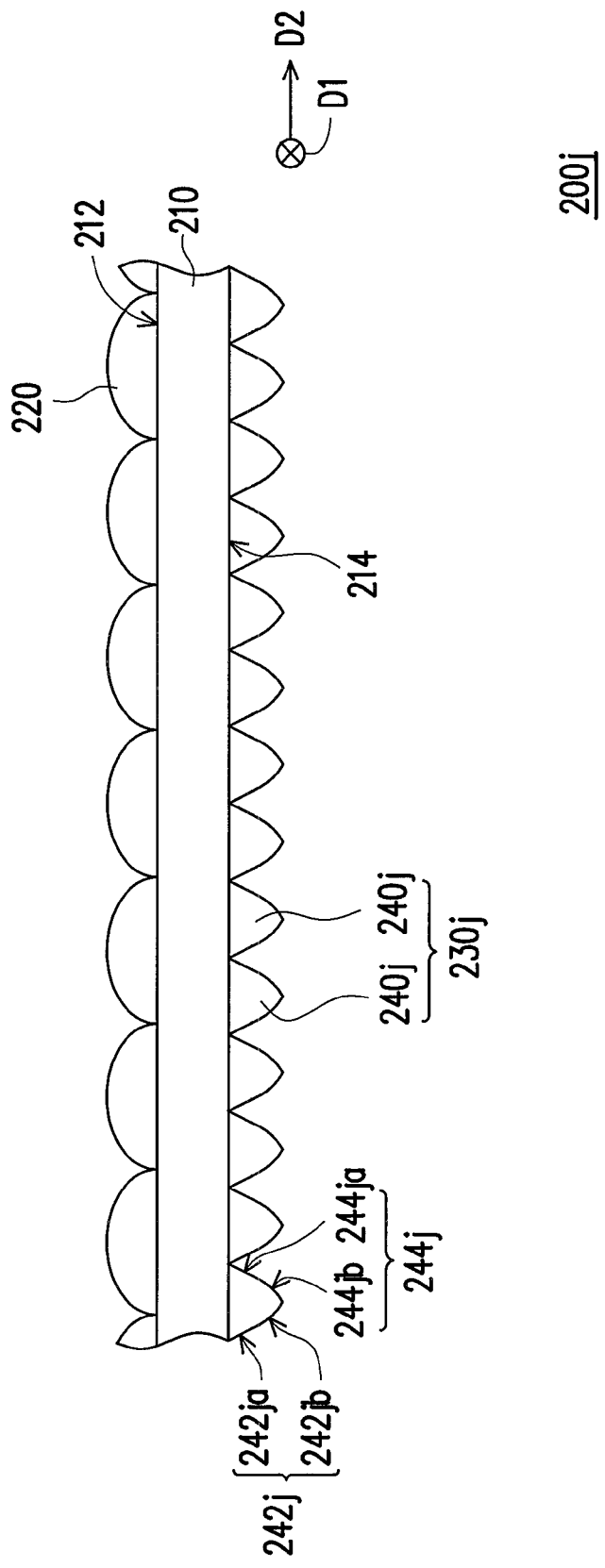
FIG. 6 is a cross-sectional view of a beam splitting film in a stereo display apparatus according to yet another embodiment of the invention.

Referring to FIG. 6, the beam splitting film 200j of the embodiment is similar to the beam splitting film 200" of FIG. 4, and differences therebetween are as follows. In the beam splitting film 200j of the embodiment, the first strip-shaped surface 242j of the strip-shaped protrusion 240j of the strip-shaped protrusion group 230j includes a first sub surface 242ja and a second sub surface 242jb connected to the first sub surface 242ja, and the second strip-shaped surface 244j includes a third sub surface 244ja and a fourth sub surface 244jb connected to the third sub surface 244ja. The second sub surface 242jb is connected to the first sub surface 242ja and the fourth sub surface 244jb, and the fourth sub surface 244jb is connected to the second sub surface 242jb and the third sub surface 244ja. In the embodiment, one of the first sub surface 242ja and the second sub surface 242jb is a plane, and the other one of the first sub surface 242ja and the second sub surface 242jb is a curved surface. Moreover, in the embodiment, one of the third sub surface 244ja and the fourth sub surface 244jb is a plane, and the other one of the third sub surface 244ja and the fourth sub surface 244jb is a curved surface. Taking FIG. 6 as an example, the first sub surface 242*ja* and the third sub surface 244*ja* are planes, and the second sub surface 242*jb* and the fourth sub surface 244*jb* are curved surfaces, for example, curved convexes.

However, in other embodiments, the first sub surface 242*ja*, the second sub surface 242*jb*, the third sub surface 244*ja*, and the fourth sub surface 244*jb* may be all curved surfaces, wherein a curvature of the first sub surface 242*ja* is different to a curvature of the second sub surface 242*jb*, and a curvature of the third sub surface 244*ja* is different to a curvature of the fourth sub surface 244*jb*.

In summary, the embodiments of the invention may have at least one of the following advantages or effects. In the beam splitting film and the backlight module according to the embodiments of the invention, since each of the cylindrical lenticular lenses corresponds to one of the strip-shaped protrusion groups, and each of the strip-shaped protrusion groups includes at least two strip-shaped protrusions, the incident light beam may be split into a plurality of light beams with different propagating angles, so as to form a plurality of vision zones. Moreover, since the stereo display apparatus of the invention applies the beam splitting film to split the illumination beam into a plurality of the light beams with different propagating angles, a plurality of vision zones may be formed. In this way, multiple users may simultaneously view the stereo images from different viewing angles.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A beam splitting film, comprising:
    a light transmissive plate, having a first surface and a second surface opposite to the first surface;
    a plurality of cylindrical lenticular lenses, disposed on the first surface; and
    a plurality of strip-shaped protrusion groups, disposed on the second surface, wherein each of the strip-shaped protrusion groups comprises at least two strip-shaped protrusions, each of the strip-shaped protrusion groups corresponds to one of the cylindrical lenticular lenses, and a distance between an orthographic projection of a geometric center of each of the strip-shaped protrusion groups on the first surface and an orthographic projection of a geometric center of the corresponding cylindrical lenticular lens on the first surface is less than ten times of a distance between geometric centers of two adjacent cylindrical lenticular lenses.

2. The beam splitting film as claimed in claim 1, wherein each of the cylindrical lenticular lenses extends along a first direction, the cylindrical lenticular lenses are arranged along a second direction, each of the strip-shaped protrusions extends along the first direction, and the strip-shaped protrusions of the strip-shaped protrusion groups are arranged along the second direction.

3. The beam splitting film as claimed in claim 2, wherein the first direction is substantially perpendicular to the second direction.

4. The beam splitting film as claimed in claim 2, wherein offsets of the geometric centers of the strip-shaped protrusion groups in the second direction relative to the geometric centers of the corresponding cylindrical lenticular lenses are increased from a center of the light transmissive plate towards two sides of the light transmissive plate in the second direction.

5. The beam splitting film as claimed in claim 1, wherein each of the strip-shaped protrusions has a first strip-shaped surface and a second strip-shaped surface connected to the first strip-shaped surface, and the first strip-shaped surface and the second strip-shaped surface are all oblique to the first surface.

6. The beam splitting film as claimed in claim 5, wherein the first strip-shaped surface and the second strip-shaped surface are planes, curved surfaces or a combination thereof.

7. The beam splitting film as claimed in claim 5, wherein the first strip-shaped surface comprises a first sub surface and a second sub surface connected to the first sub surface, the second strip-shaped surface comprises a third sub surface and a fourth sub surface connected to the third sub surface, the second sub surface is connected to the first sub surface and the fourth sub surface, the fourth sub surface is connected to the second sub surface and the third sub surface, one of the first sub surface and the second sub surface is a plane, the other one of the first sub surface and the second sub surface is a curved surface, one of the third sub surface and the fourth sub surface is a plane, and the other one of the third sub surface and the fourth sub surface is a curved surface.

8. The beam splitting film as claimed in claim 5, wherein the first strip-shaped surface comprises a first sub surface and a second sub surface connected to the first sub surface, the second strip-shaped surface comprises a third sub surface and a fourth sub surface connected to the third sub surface, the second sub surface is connected to the first sub surface and the fourth sub surface, the fourth sub surface is connected to the second sub surface and the third sub surface, each of the first sub surface and the second sub surface is a curved surface, each of the third sub surface and the fourth sub surface is a curved surface, a curvature of the first sub surface is different to a curvature of the second sub surface, and a curvature of the third sub surface is different to a curvature of the fourth sub surface.

9. The beam splitting film as claimed in claim 1, wherein a focal plane of each of the cylindrical lenticular lenses falls within a range from the second surface to a top of the strip-shaped protrusions of the strip-shaped protrusion group located away from the second surface.

10. The beam splitting film as claimed in claim 1, wherein each of the strip-shaped protrusions has a vertex angle away from the second surface, and the vertex angle is within a range greater than or equal to 40 degrees and smaller than or equal to 90 degrees.

11. The beam splitting film as claimed in claim 1, wherein each of the strip-shaped protrusions has a vertex angle away from the second surface, and the vertex angle is a chamfer.

12. The beam splitting film as claimed in claim 1, wherein a distance between the geometric centers of the two adjacent cylindrical lenticular lenses is greater than or equal to 1.5 times of a distance between geometric centers of the two adjacent strip-shaped protrusions.

13. A backlight module, comprising:
a beam splitting film, comprising:
a light transmissive plate, having a first surface and a second surface opposite to the first surface;
a plurality of cylindrical lenticular lenses, disposed on the first surface; and
a plurality of strip-shaped protrusion groups, disposed on the second surface, wherein each of the strip-shaped protrusion groups comprises at least two strip-shaped protrusions, each of the strip-shaped protrusion groups corresponds to one of the cylindrical lenticular lenses, and a distance between an orthographic projection of a geometric center of each of the strip-shaped protrusion groups and an orthographic projection of a geometric center of the corresponding cylindrical lenticular lens is less than ten times of a distance between geometric centers of two adjacent cylindrical lenticular lenses;
a light guiding plate, disposed at a side of the beam splitting film, wherein the light guiding plate has a third surface, a fourth surface opposite to the third surface, and two light incident surfaces connected to the third surface and the fourth surface, the two light incident surfaces are respectively located at two opposite sides of the light guiding plate, and the third surface is located between the second surface and the fourth surface; and
two light emitting devices, respectively disposed beside the two light incident surfaces and capable of emitting two light beams, wherein the two light beams respectively enter the light guiding plate through the two light incident surfaces, and are transmitted to the beam splitting film through the third surface, and the two light emitting devices are capable of alternately flickering.

14. The backlight module as claimed in claim 13, wherein each of the cylindrical lenticular lenses extends along a first direction, the cylindrical lenticular lenses are arranged along a second direction, each of the strip-shaped protrusions extends along the first direction, and the strip-shaped protrusions of the strip-shaped protrusion groups are arranged along the second direction.

15. The backlight module as claimed in claim 14, wherein the first direction is substantially perpendicular to the second direction.

16. The backlight module as claimed in claim 14, wherein offsets of the geometric centers of the strip-shaped protrusion groups in the second direction relative to the geometric centers of the corresponding cylindrical lenticular lenses are increased from a center of the light transmissive plate towards two sides of the light transmissive plate in the second direction.

17. The backlight module as claimed in claim 13, wherein each of the strip-shaped protrusions has a first strip-shaped surface and a second strip-shaped surface connected to the first strip-shaped surface, and the first strip-shaped surface and the second strip-shaped surface are all oblique to the first surface.

18. The backlight module as claimed in claim 17, wherein the first strip-shaped surface and the second strip-shaped surface are planes, curved surfaces or a combination thereof.

19. The backlight module as claimed in claim 17, wherein the first strip-shaped surface comprises a first sub surface and a second sub surface connected to the first sub surface, the second strip-shaped surface comprises a third sub surface and a fourth sub surface connected to the third sub surface, the second sub surface is connected to the first sub surface and the fourth sub surface, the fourth sub surface is connected to the second sub surface and the third sub surface, one of the first sub surface and the second sub surface is a plane, the other one of the first sub surface and the second sub surface is a curved surface, one of the third sub surface and the fourth sub surface is a plane, and the other one of the third sub surface and the fourth sub surface is a curved surface.

20. The backlight module as claimed in claim 17, wherein the first strip-shaped surface comprises a first sub surface and a second sub surface connected to the first sub surface, the second strip-shaped surface comprises a third sub surface and a fourth sub surface connected to the third sub surface, the second sub surface is connected to the first sub surface and the fourth sub surface, the fourth sub surface is connected to the second sub surface and the third sub surface, each of the first sub surface and the second sub surface is a curved surface, each of the third sub surface and the fourth sub surface is a curved surface, a curvature of the first sub surface is different to a curvature of the second sub surface, and a curvature of the third sub surface is different to a curvature of the fourth sub surface.

21. The backlight module as claimed in claim 13, wherein a focal plane of each of the cylindrical lenticular lenses falls within a range from the second surface to a top of the strip-shaped protrusions of the strip-shaped protrusion group located away from the second surface.

22. The backlight module as claimed in claim 13, wherein each of the strip-shaped protrusions has a vertex angle away from the second surface, and the vertex angle is within a range greater than or equal to 40 degrees and smaller than or equal to 90 degrees.

23. The backlight module as claimed in claim 13, wherein a distance between the geometric centers of the two adjacent cylindrical lenticular lenses is greater than or equal to 1.5 times of a distance between geometric centers of the two adjacent strip-shaped protrusions.

24. A stereo display apparatus, comprising:
a backlight source, capable of providing an illumination beam;
a liquid crystal display panel, disposed above the backlight source;
a beam splitting film disposed between the backlight source and the LCD panel, wherein the beam splitting film splits the illumination beam into a plurality of light beams with different propagating angles, so as to form a plurality of vision zones, wherein the beam splitting film comprises:
a light transmissive plate, having a first surface and a second surface opposite to the first surface; and a plurality of cylindrical lenticular lenses, disposed on the first surface; and a plurality of strip-shaped protrusion groups, disposed on the second surface, wherein each of the strip-shaped protrusion groups comprises at least two strip-shaped protrusions, each of the strip-shaped protrusion groups corresponds to one of the cylindrical lenticular lenses, and a distance between an orthographic projection of a geometric center of each of the strip-shaped protrusion groups on the first surface and an orthographic projection of a geometric center of the corresponding cylindrical lenticular lens on the first surface is less than ten times of a distance between geometric centers of two adjacent cylindrical lenticular lenses.

25. The stereo display apparatus as claimed in claim 24, further comprising:

a light guiding plate, disposed at a side of the beam splitting film, wherein the light guiding plate has a third surface, a fourth surface opposite to the third surface, and two light incident surfaces connected to the third surface and the fourth surface, the two light incident surfaces are respectively located at two opposite sides of the light guiding plate, and the third surface is located between the second surface and the fourth surface; and two light emitting devices, respectively disposed beside the two light incident surfaces and capable of emitting two light beams, wherein the two light beams respectively enter the light guiding plate through the two light incident surfaces, and are transmitted to the beam splitting film through the third surface, the two light emitting devices are capable of alternately flickering, the two light beams form the backlight source on the third surface, and the two light beams form the illumination beam.

26. The stereo display apparatus as claimed in claim 24, wherein each of the cylindrical lenticular lenses extends along a first direction, the cylindrical lenticular lenses are arranged along a second direction, each of the strip-shaped protrusions extends along the first direction, and the strip-shaped protrusions of the strip-shaped protrusion groups are arranged along the second direction.

27. The stereo display apparatus as claimed in claim 26, wherein the first direction is substantially perpendicular to the second direction.

28. The stereo display apparatus as claimed in claim 26, wherein offsets of the geometric centers of the strip-shaped protrusion groups in the second direction relative to the geometric centers of the corresponding cylindrical lenticular lenses are increased from a center of the light transmissive plate towards two sides of the light transmissive plate in the second direction.

* * * * *